Oct. 16, 1928.
F. K. TARRANT
1,688,164
INTERNAL COMBUSTION ENGINE
Filed March 4, 1927
2 Sheets-Sheet 1
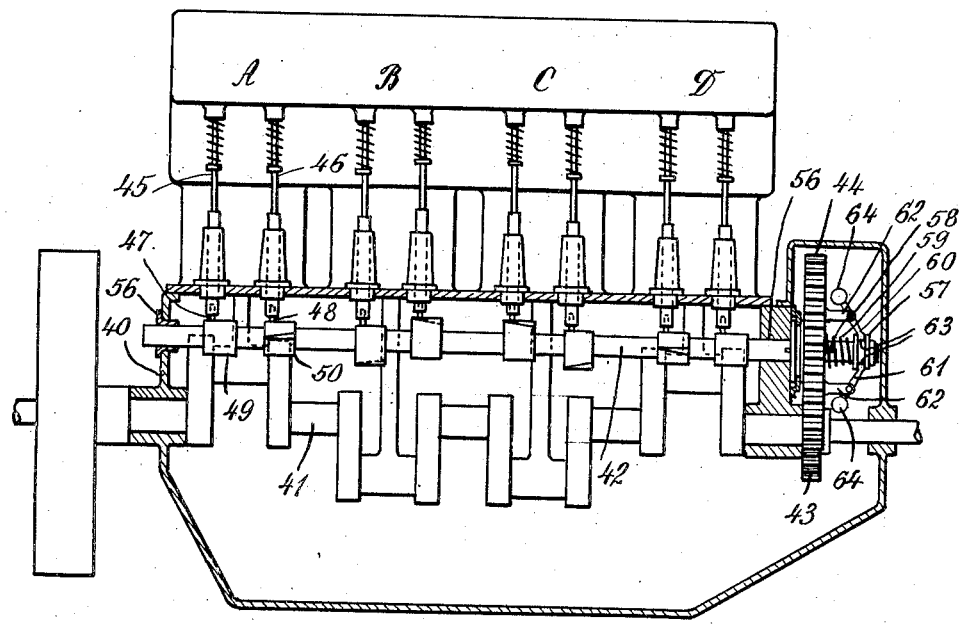
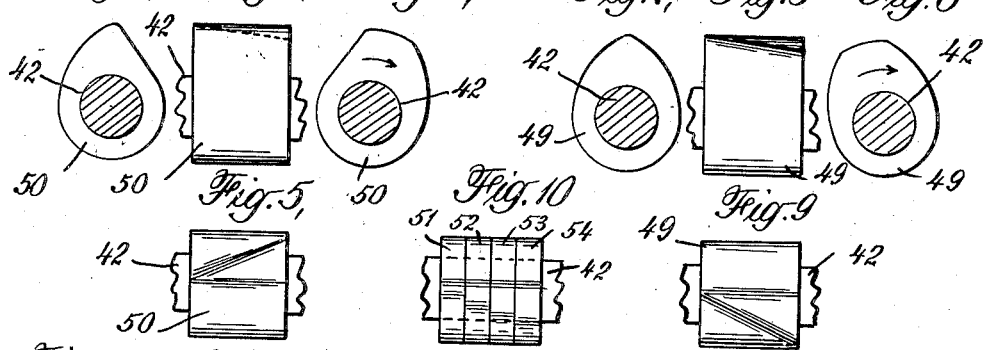
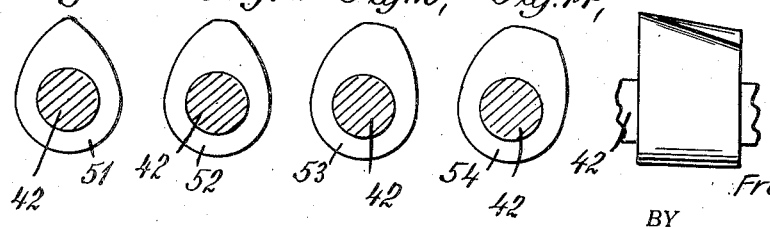
INVENTOR
Fred. K. Tarrant
BY
Marshall & Hawley,
ATTORNEYS

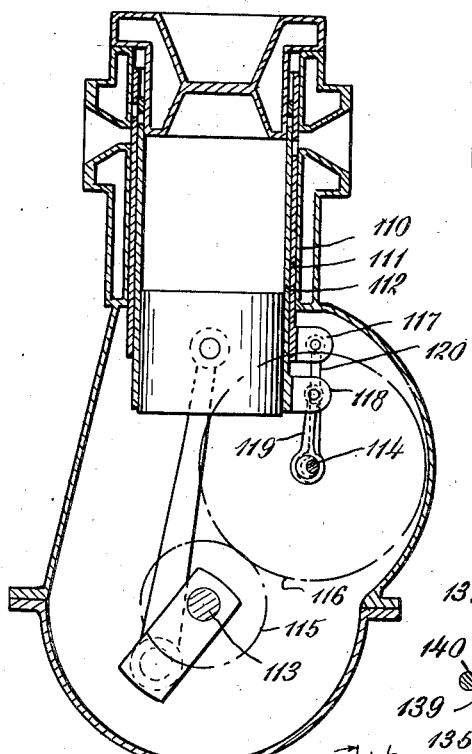
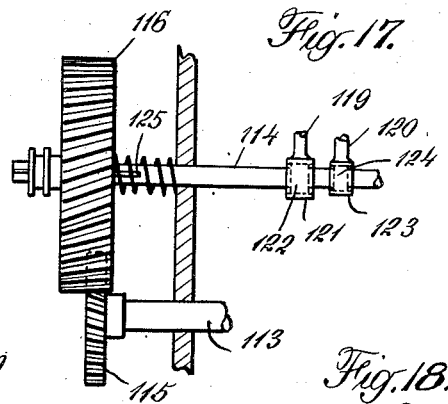
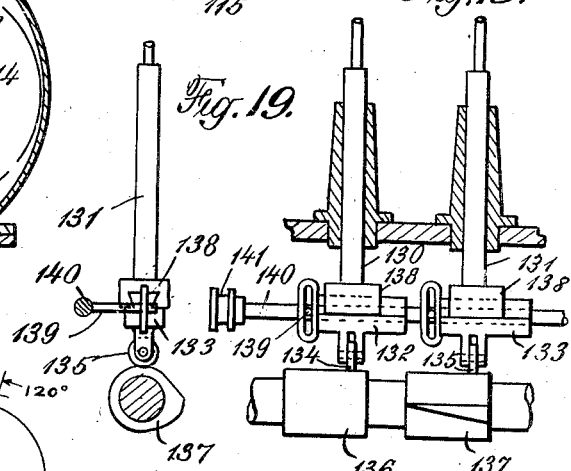
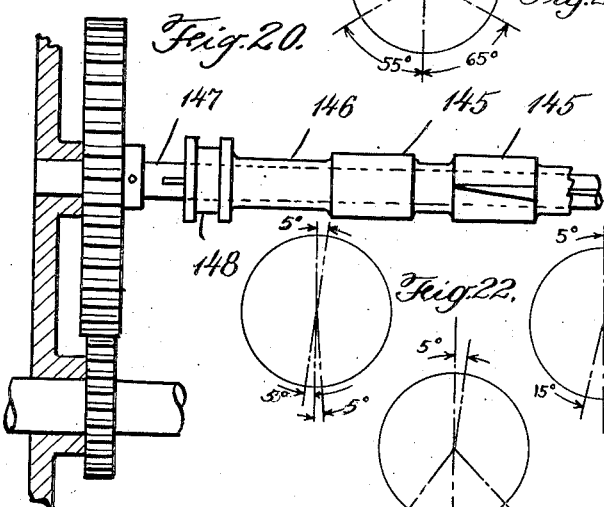
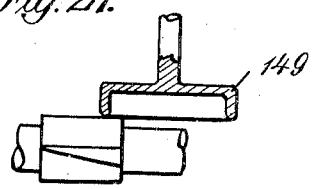
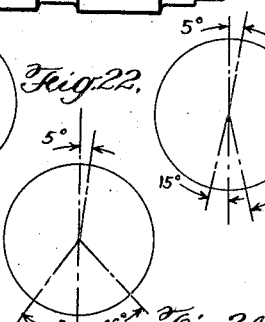
INVENTOR
Fred K. Tarrant
BY
Marshall Hawley
ATTORNEYS Patented Oct. 16, 1928.

1,688,164

UNITED STATES PATENT OFFICE.

FRED K. TARRANT, OF YUMA, COLORADO.

INTERNAL-COMBUSTION ENGINE.

Application filed March 4, 1927. Serial No. 172,611.

This invention relates to internal combustion engines and, particularly, to valve mechanism for such engines.

As is well known, the valves of internal combustion engines are timed to open and close at certain intervals in the cycle of operation of the engine. With the valve timing fixed, the motor will develop its maximum horse power at a certain speed and at other speeds, will operate much less efficiently and will develop much less horse power.

For instance, a racing motor will have its valves timed to develop a maximum horse power at high speeds whereas a truck or ordinary passenger cars have their valves timed to develop maximum horse power at lower speeds. If the valves are timed to develop maximum horse power at forty miles per hour, then at speeds below forty miles per hour, much less horse power is developed; also at speeds above forty miles per hour, the horse power is reduced. Thus it will be seen that at all speeds other than the speed at which maximum horse power is developed, the motor will be operating inefficiently.

This invention has for its salient object to provide valve control mechanism for an internal combustion engine so constructed and arranged that the engine will operate efficiently at all speeds.

Another object of the invention is to provide automatically controlled, variable valve timing mechanism so constructed and arranged that the timing of the valves is automatically regulated in accordance with the engine speed.

Another object of the invention is to provide automatic valve timing mechanism so constructed that the operation of the intake and exhaust valves will be so coordinated with the speed of the motor that the valves will be operated in a manner to give a maximum power output at all speeds instead of at a single speed.

Further objects of the invention will appear from the following specification taken in connection with the drawings, which form a part of this application, and in which Fig. 1 is a longitudinal, sectional elevation of an internal combustion engine showing valve control mechanism constructed in accordance with the invention;

Fig. 2 is an elevational view of a valve cam for operating one of the exhaust valves;

Fig. 3 is an end elevation of the cam shown in Fig. 2, looking toward the right;

Fig. 4 is an end elevation of the cam shown in Fig. 2, looking toward the left;

Fig. 5 is a top plan view of the cam shown in Fig. 2;

Figs. 6, 7, 8 and 9 are views similar to Figs. 3 to 5 inclusive but illustrating an intake valve cam;

Fig. 10 is a top plan view of a cam similar to the cam shown in Fig. 9 but made up of a plurality of disks;

Figs. 11, 12, 13 and 14 are elevational views looking toward the left of the disks which make up the cam shown in Fig. 10;

Fig. 15 is an elevational view of another form of cam which may be used to vary the height of the valve lift;

Fig. 16 is a sectional elevation of a sleeve valve motor and the valve operating mechanism;

Fig. 17 is an elevational view of control mechanism adapted for controlling the sleeve valves shown in Fig. 16;

Fig. 18 is a sectional elevation showing a variable adjustment between the valve stems and the cam shaft whereby the valve tappets or rollers are adapted to engage the cams at different points thereon;

Fig. 19 is a sectional elevation taken at right angles to Fig. 18 showing the adjustable connections between the valve stems and the tappets or rollers;

Fig. 20 is a sectional elevation showing a construction in which the cams are adjustable longitudinally on the cam shaft;

Fig. 21 is a sectional elevation showing a "mushroom" type of tappet;

Figs. 22 to 25, inclusive, illustrate diagrammatically the manner in which the valve opening and closing can be controlled by the valve control mechanism.

The invention briefly described consists of valve control mechanism for internal combustion engines so constructed and arranged that the opening and closing of the intake and exhaust valves will be automatically or manually coordinated with the speed of operation of the motor, thus causing the motor to operate at its highest efficiency throughout a wide range of speeds. This result can be accomplished by various forms of mechanism, such as speed governors, so connected to the valve mechanism that the valve cams or valve shafts will be automatically adjusted as the speed of the motor varies. The cams for operating the valves can have any desired contour in order that the opening and closing of the intake and exhaust valves will be varied as the cams or cam shafts are adjusted. Further details of the invention will appear from the following description.

One embodiment of the invention is illustrated in Fig. 1 wherein there is disclosed an internal combustion engine comprising a plurality of cylinders A, B, C and D, each cylinder having intake and exhaust valves.

The cylinders are mounted on a crank case 40 having a crank shaft 41 therein and a cam shaft 42 geared to the crank shaft by means of gears 43 and 44.

Each cylinder has an intake valve operated by a valve stem 45 and an exhause valve operated by a valve stem 46. The valve stems carry at their lower ends tappets or rollers 47 and 48 which engage cams 49 and 50 carried by the came shaft 42.

The cams 50 for operating the exhaust valves may have any desired contour but the came illustrated in Figs. 2 to 5 inclusive is well adapted for this use.

From the showings in Figs. 2 to 5 and 6 to 9 of the exhaust and intake valve cams, it will be evident that the valve operation will be varied as the tappets or rollers engage the cams at different points in the length thereof. For instance, if the roller 48 engages the exhaust cam shown in Fig. 5 adjacent the right hand edge thereof, the exhaust valve will be opened earlier and will remain open longer than it will if the tappet or roller engages the cam adjacent the left hand edge; also, a corresponding change in the operation of the intake valve will take place as the cam is adjusted to engage the roller at different longitudinal points on the cam.

The cam shaft 42 is sidable longitudinally in bearings 56 and 56 and has a grooved collar 57 secured to one end thereof. The shaft has a spline 58 on which the gear 44 is mounted and a spring 59 is interposed between the collar 57 and the gear 44.

In the particular form of the invention illustrated, a ball governor is shown, the governor consisting of a pair of lever arms 60 and 61 mounted on posts 62 carried by the gear 44. The arms 60 and 61 have spherical inner ends 63 which are disposed in the groove of the collar 57 and balls 64 are secured to their outer ends. The ball governor operates in the usual manner and as the engine speeds up, the balls fly outwardly, thus moving the inner ends of the arms 60 and 61 in a direction towards the gear 44 and moving the cam shaft to the left.

Figs. 10 to 14 inclusive illustrate a cam made up of a plurality of disks 51, 52, 53 and 54 on the cam shaft 42 as shown in Fig. 10. These disks, as illustrated in Figs. 11, 12, 13 and 14 have different contours and as the cam shaft is adjusted longitudinally, the valve tappet or roller will engage different disks and the valve action will thereby be varied.

Under certain conditions, it may be desirable to have a cam such as that illustrated in Fig. 15. By means of this cam the lift of the valve can be varied to suit different conditions of operation of the engine.

Figs. 22 to 25 inclusive illustrate one set of conditions that might be encountered in engine operation. Assume, for instance, that in Fig. 22 an engine is operated at 500 revolutions per minute and that under these conditions, the valve tappets are disposed at the left hand ends of the cams shown in Figs. 1 to 9 inclusive. As shown in Fig. 22, the intake valve will open 5° past top dead center and will close 5° past bottom dead center. The exhaust valve opens 5° in advance of bottom dead center and closes at top dead center.

Now, if the engine is speeded up to say 1000 R. P. M., the balls of the governor will move outwardly, moving the cam shaft to the left in Fig. 1 and in this position of adjustment, the intake will open 5° past top dead center and will remain open 15° past bottom dead center. The exhaust valve will open 12° ahead of bottom dead center and will close at top dead center.

If the engine is again speeded up to say 2500 R. P. M., the balls of the governor will move outwardly still further, again moving the cam shaft to the left and positioning the cams in such a manner that the intake will open 5° past top dead center and will close 35° past bottom dead center and the exhaust valve will open 45° ahead of bottom dead center and will close at top dead center.

If the engine is still further speeded up and the valve tappets are disposed at the right hand ends of the cams 49 and 50, the intake will be open 5° past top dead center and will remain open 55° past bottom dead center or in all 230° and the exhaust valve will open 65° ahead of bottom dead center and will close at top dead center.

It will be understood that the above examples are given merely by way of illustration and that the cams may be so designed as to open and close the exhaust valves at any desired times in the cycle of operation. It may be found desirable, for instance, to open the intake valve 10 or 15 degrees past top dead center so that a considerable vacuum will have been created before the inrush of the charge of fuel.

Fig. 16 illustrates a common type of sleeve valve motor in which there is shown a cylinder 110, a pair of sleeves 111 and 112, a crank shaft 113 and a cam or eccentric shaft 114 connected by gears 115 and 116 to the crank shaft.

The sleeves 111 and 112 are provided with lugs 117 and 118 which are connected by valve rods or pitmen 119 and 120 to the cam shaft. The connection 119 is provided with an eccentric ring 121 which surrounds an eccentric 122 and the pitman or connection 120 has an eccentric ring 123 which surrounds an eccentric 124.

The gears 116 and 115 are helical in formation and the gear 116 is splined as shown at 125 to the shaft 114.

As the gear 116 is moved longitudinally on the shaft 114, the helical formation of the gear will cause the gear to rotate the shaft, thus changing the timing of the valves 111 and 112.

In Figs. 18 and 19 the valve stems 130 and 131 are connected by a dovetail connection to sliding blocks 132 and 133 which in turn carry tappets or rollers 134 and 135 adapted to coact with cams 136 and 137. The blocks 132 and 133 are slidably mounted on the heads 138 of the valve rods or stems and are pinned as shown at 139 to a shaft 140. In this instance, the governor mechanism will co-act with the grooved collar 141 carried by the shaft 140 and will adjust the blocks 132 and 133 and, of course, other blocks which will be mounted thereon longitudinally with reference to the cams 136 and 137. As the blocks and tappets or rollers carried thereby are adjusted, the tappets or rollers will coact with different portions of the cams in a manner which will be clear from the preceding description.

In Fig. 20 the cams 145 are carried by a sleeve 146 which is longitudinally adjustable on and is keyed to a shaft 147. The sleeve 146 has a collar 148 adapted to coact with the governor mechanism by means of which the sleeve and cams will be adjusted longitudinally on the shaft 147.

Fig. 21 illustrates a "mushroom" type of valve tappet 149 which is adapted to coact with the cams in the usual manner.

The operation of the valve control mechanism may be briefly summed up as follows. With the automatic governor mechanism illustrated in Fig. 1, as the engine is speeded up, the cam shaft is moved longitudinally, thereby positioning different portions of the cams beneath the rollers or tappets and varying the valve action of the intake and exhaust valves.

Although certain specific embodiments of the invention have been particularly shown and described, it will be understood that the invention is capable of modification and that changes in the construction and in the arrangement of the various cooperating parts may be made without departing from the spirit or scope of the invention, as expressed in the following claims.

What I claim is:

1. In an internal combustion engine comprising a cylinder, a crank shaft, valves for said cylinder, a cam for operating each valve, tappets engaging said cams, and means for shifting said tappets relative to and axially of said cams, said cams being so constructed and arranged as to increase the period of opening of the intake and exhaust valves as the engine speed increases.

2. In an internal combustion engine, comprising a cylinder, a crank shaft, valves for said cylinder, a cam for operating each valve, tappets engaging said cams, and speed controlled means including a governor for shifting said tappets relative to and axially of said cams, said cams being so constructed and arranged as to increase the period of opening of the intake and exhaust valves as the engine speed increases.

3. An internal combustion engine, comprising a cylinder, a crank shaft, valves for said cylinder, cams for operating each of said valves, valve tappets engaging said cams, means for shifting said tappets relative to and axially of said cams, thereby to vary the timing of said valves.

4. An internal combustion engine comprising a cylinder, a crank shaft, valves for said cylinder, cams for operating each of said valves, valve tappets engaging said cams, speed control means including a governor for shifting said tappets relative to and axially of said cams, thereby to vary the timing of said valves.

5. An internal combustion engine comprising a cylinder, a crank shaft, valves for said cylinder, cams for operating each of said valves, valve tappets engaging said cam, and means for shifting said tappets relative to and axially of the cams thereby to vary the timing of said valves, said cams being so constructed and arranged as to increase the period of opening of the valves as the engine speed increases.

6. An internal combustion engine, comprising a cylinder, a crank shaft, valves for said cylinder, a cam for operating each of said valves, valve tappets engaging said cams, and speed controlled means, including a governor, for shifting said tappets relative to and axially of the cams, thereby to vary the timing of said valves, said cams being so constructed and arranged as to increase the period of opening of the valves as the engine speed increases.

7. An internal combustion engine, comprising a plurality of cylinders, a crank shaft, intake and exhaust valves for each cylinder, a cam for operating each intake valve, and a cam for operating each exhaust valve, valve tappets engaging said cams, and means for shifting said tappets relative to and axially of said cams, thereby to vary the timing of said valves, said means comprising a shaft to which the tappets are pinned, said tappets being slidably mounted on the valve stems, and a connection for shifting said shaft.

8. An internal combustion engine, comprising a plurality of cylinders, a crank shaft, intake and exhaust valves for each cylinder, a cam for operating each intake valve, and a cam for operating each exhaust valve, valve tappets engaging said cams, and means for shifting said tappets relative to and axially of said cams, thereby to vary the timing of said valves, said means comprising a shaft to which the tappets are pinned, said tappets being slidably mounted on the valve stems, and a connection for shifting said shaft, said cams being so constructed and arranged as to increase the period of opening of the intake and exhaust valves as the engine speed increases.

In witness whereof, I have hereunto set my hand this 26th day of February, 1927.

FRED K. TARRANT.